United States Patent
Kramer et al.

(10) Patent No.: US 12,129,788 B2
(45) Date of Patent: Oct. 29, 2024

(54) INTRODUCING STEAM WITH QUENCH AIR INTO TURBINE ENGINE COMBUSTOR

(71) Applicant: Raytheon Technologies Corporation, Farmington, CT (US)

(72) Inventors: Stephen K. Kramer, Cromwell, CT (US); Lance L. Smith, West Hartford, CT (US); Gregory Boardman, Owens Cross Roads, AL (US); Zhongtao Dai, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/121,434

(22) Filed: Mar. 14, 2023

(65) Prior Publication Data
US 2024/0309808 A1   Sep. 19, 2024

(51) Int. Cl.
   *F02C 3/30*   (2006.01)
(52) U.S. Cl.
   CPC ............ *F02C 3/30* (2013.01); *F05D 2220/32* (2013.01); *F05D 2240/35* (2013.01); *F05D 2270/08* (2013.01)
(58) Field of Classification Search
   CPC .................................. F02C 3/30; F02C 3/305
   See application file for complete search history.

(56) References Cited

U.S. PATENT DOCUMENTS

| | | | |
|---|---|---|---|
| 3,747,336 A | 7/1973 | Dibelius | |
| 5,054,279 A | 10/1991 | Hines | |
| 6,370,862 B1 | 4/2002 | Cheng | |
| RE43,252 E | 3/2012 | Ginter | |
| 11,353,215 B1* | 6/2022 | Tentorio | F23R 3/343 |
| 2014/0338359 A1* | 11/2014 | Valeev | F23R 3/36 60/776 |
| 2015/0040576 A1* | 2/2015 | Graves | F23R 3/28 60/776 |
| 2016/0230995 A1 | 8/2016 | Koganezawa | |
| 2017/0219212 A1 | 8/2017 | Laster | |
| 2019/0309952 A1 | 10/2019 | Miduturi | |

FOREIGN PATENT DOCUMENTS

JP   H0385330 U   8/1991

OTHER PUBLICATIONS

EP search report for EP24163673.7 dated Sep. 6, 2024.

\* cited by examiner

*Primary Examiner* — Ehud Gartenberg
*Assistant Examiner* — Jacek Lisowski
(74) *Attorney, Agent, or Firm* — Getz Balich LLC

(57) ABSTRACT

An assembly is provided for a turbine engine. This assembly includes a housing, a combustor and a steam injector. The housing includes an air plenum. The combustor is disposed within the air plenum. The combustor includes a combustor wall and a combustion chamber. The combustor wall is disposed between the combustion chamber and the air plenum. The combustor wall includes a quench aperture that extends through the combustor wall from the air plenum to the combustion chamber. The steam injector projects partially into or through the quench aperture.

11 Claims, 14 Drawing Sheets

INTRODUCING STEAM WITH QUENCH AIR INTO TURBINE ENGINE COMBUSTOR

BACKGROUND OF THE DISCLOSURE

1. Technical Field

This disclosure relates generally to a turbine engine and, more particularly, to utilizing steam during operation of the turbine engine.

2. Background Information

As government emissions standards tighten, interest in alternative fuels for gas turbine engines as well as more efficient engine cycles continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor. Various systems and methods are known in the art for recovering the water vapor. Various system and methods are also known in the art for producing and utilizing steam from the recovered water vapor. While these known systems and methods have various advantages, there is still room in the art for improvement.

SUMMARY OF THE DISCLOSURE

According to an aspect of the present disclosure, an assembly is provided for a turbine engine. This assembly includes a housing, a combustor and a steam injector. The housing includes an air plenum. The combustor is disposed within the air plenum. The combustor includes a combustor wall and a combustion chamber. The combustor wall is disposed between the combustion chamber and the air plenum. The combustor wall includes a quench aperture that extends through the combustor wall from the air plenum to the combustion chamber. The steam injector projects partially into or through the quench aperture.

According to another aspect of the present disclosure, another assembly is provided for a turbine engine. This assembly includes a housing, a combustor and a steam system. The housing includes an air plenum. The combustor is disposed within the air plenum. The combustor includes a combustor wall and a combustion chamber. The combustor wall is disposed between the combustion chamber and the air plenum. The combustor wall includes a quench aperture that extends longitudinally along a longitudinal centerline through the combustor wall from the air plenum to the combustion chamber. The quench aperture has an elongated cross-sectional geometry in a reference plane perpendicular to the longitudinal centerline. The steam system includes a steam injector. The steam system is configured to direct steam out of the steam injector into the combustion chamber with air flowing through the quench aperture from the air plenum into the combustion chamber.

According to still another aspect of the present disclosure, another assembly is provided for a turbine engine. This assembly includes a housing, a combustor, a steam system and a mixer. The housing includes an air plenum. The combustor is disposed within the air plenum. The combustor includes a combustor wall and a combustion chamber. The combustor wall is disposed between the combustion chamber and the air plenum. The combustor wall includes a quench aperture that extends through the combustor wall from the air plenum to the combustion chamber. The steam system includes a steam injector. The steam system is configured to direct steam out of the steam injector into the combustion chamber with air flowing through the quench aperture from the air plenum into the combustion chamber. The mixer is configured to mix the steam with the air. The mixer is configured as part of or attached to the steam injector and/or the combustor wall.

The steam injector may be asymmetrically positioned with the quench aperture.

The steam injector may project partially into or through the quench aperture.

The assembly may also include a steam system that includes the steam injector. The steam system may be configured to direct steam out of the steam injector into the combustion chamber with air flowing through the quench aperture from the air plenum into the combustion chamber.

The assembly may also include a mixer configured to mix the steam with the air.

The steam injector may include the mixer.

The combustor wall may also include the mixer.

The steam injector may be configured with a single steam outlet. The steam system may be configured to direct the steam out of the steam injector through the single steam outlet.

The steam injector may be configured with a plurality of steam outlets. The steam system may be configured to direct the steam out of the steam injector through the steam outlets.

The steam injector may project partially into the quench aperture.

The steam injector may project through the quench aperture to or into the combustion chamber.

The combustor wall may also include a chute. The chute may project partially into the air plenum and may extend circumferentially about an inlet to the quench aperture from the air plenum.

The combustor wall may also include a chute. The chute may project partially into the combustion chamber and may extend circumferentially about an outlet from the quench aperture into the combustion chamber.

The chute may include a tubular body.

The chute may include an arcuate body.

The quench aperture may have a longitudinal centerline and an elongated cross-sectional geometry in a reference plane perpendicular to the longitudinal centerline.

The steam injector may be coaxial with the quench aperture.

The steam injector may be non-coaxial with the quench aperture.

The quench aperture may extend laterally between an upstream side and a downstream side relative to a flow of combustion products within the combustion chamber. The steam injector may be arranged closer to the upstream side than the downstream side.

The quench aperture may extend laterally between an upstream side and a downstream side relative to a flow of combustion products within the combustion chamber. The steam injector may be arranged closer to the downstream side than the upstream side.

The assembly may also include a second steam injector projecting partially into or through the quench aperture.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
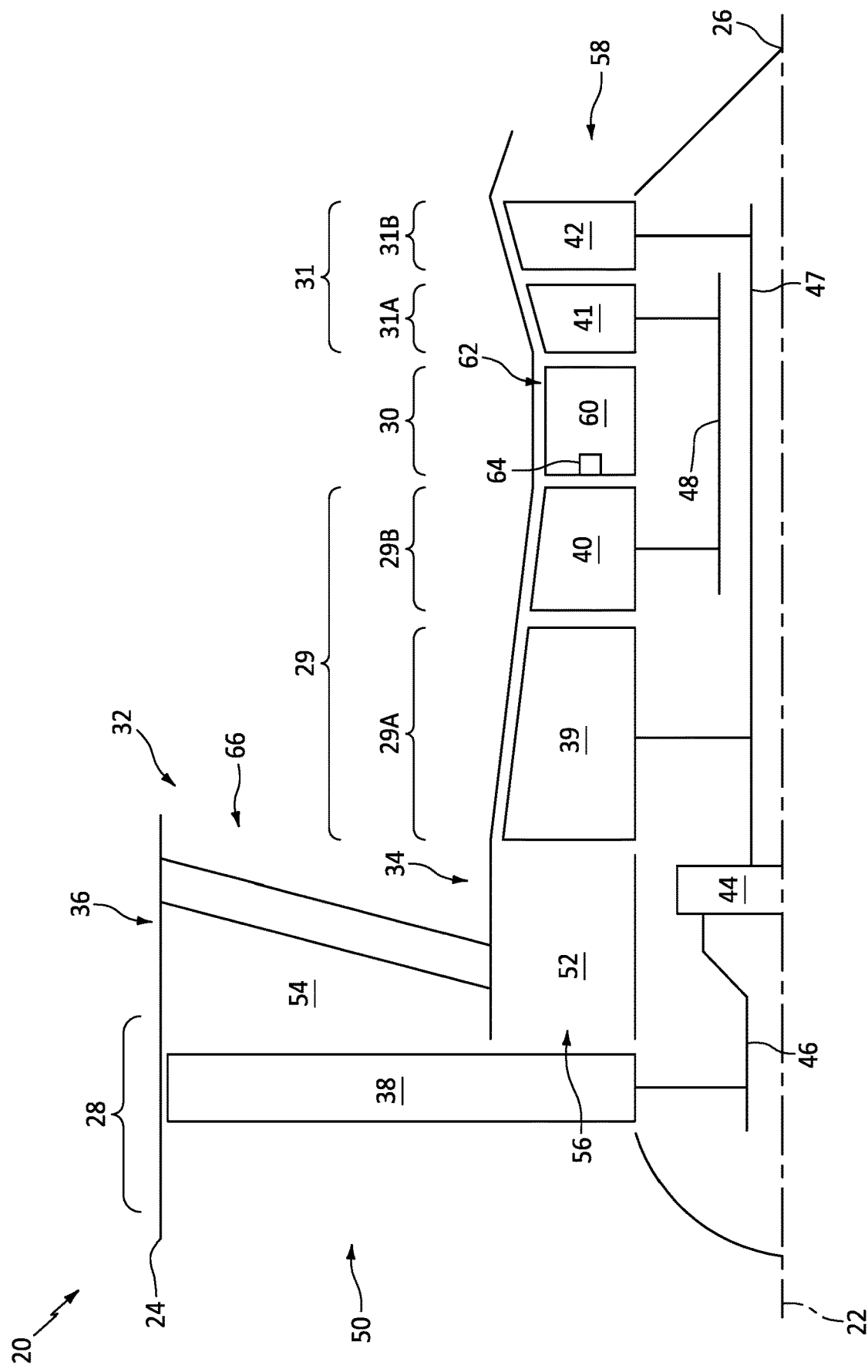
FIG. 1 is a partial schematic illustration of a gas turbine engine.

FIG. 1 is a side sectional illustration of a gas turbine engine 20 for an aircraft propulsion system. This turbine engine 20 extends axially along an axial centerline 22 between a forward, upstream end 24 and an aft, downstream end 26. The turbine engine 20 includes a fan section 28, a compressor section 29, a combustor section 30 and a turbine section 31. The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-31B of FIG. 1 are arranged sequentially along the axial centerline 22 within an engine housing 32. This engine housing 32 includes an inner case 34 (e.g., a core case) and an outer case 36 (e.g., a fan case). The inner case 34 may house one or more of the engine sections 29A-31B; e.g., a core of the turbine engine 20. The outer case 36 may house at least the fan section 28.

Each of the engine sections 28, 29A, 29B, 31A and 31B includes a respective bladed rotor 38-42. Each of these bladed rotors 38-42 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 38 is connected to a geartrain 44, for example, through a fan shaft 46. The geartrain 44 and the LPC rotor 39 are connected to and driven by the LPT rotor 42 through a low speed shaft 47. The HPC rotor 40 is connected to and driven by the HPT rotor 41 through a high speed shaft 48. The engine shafts 46-48 are rotatably supported by a plurality of bearings; e.g., rolling element and/or thrust bearings. Each of these bearings is connected to the engine housing 32 by at least one stationary structure such as, for example, an annular support strut.

During engine operation, air enters the turbine engine 20 through an airflow inlet 50 into the turbine engine 20. This air is directed through the fan section 28 and into a core flowpath 52 and a bypass flowpath 54. The core flowpath 52 extends sequentially through the engine sections 29A-31B (e.g., the engine core) from an inlet 56 into the core flowpath 52 to an exhaust 58 from the core flowpath 52. The air within the core flowpath 52 may be referred to as "core air". The bypass flowpath 54 extends through a bypass duct, and bypasses the engine core. The air within the bypass flowpath 54 may be referred to as "bypass air".

The core air is compressed by the LPC rotor 39 and the HPC rotor 40 and directed into a (e.g., annular) combustion chamber 60 of a (e.g., annular) combustor 62 in the combustor section 30. Fuel is injected by one or more fuel injector assemblies 64 (one visible in FIG. 1) into the combustion chamber 60 and mixed with the compressed core air to provide a fuel-air mixture. This fuel-air mixture is ignited and combustion products thereof flow through and sequentially cause the HPT rotor 41 and the LPT rotor 42 to rotate before being directed out of the turbine engine 20 through the core exhaust 58. The rotation of the HPT rotor 41 and the LPT rotor 42 respectively drive rotation of the HPC rotor 40 and the LPC rotor 39 and, thus, compression of the air received from the core inlet 56. The rotation of the LPT rotor 42 also drives rotation of the fan rotor 38, which propels the bypass air through the bypass flowpath 54 and out of the turbine engine 20 through an exhaust 66 from the bypass flowpath 54. The propulsion of the bypass air may account for a majority of thrust generated by the turbine engine 20.

Figure 2:
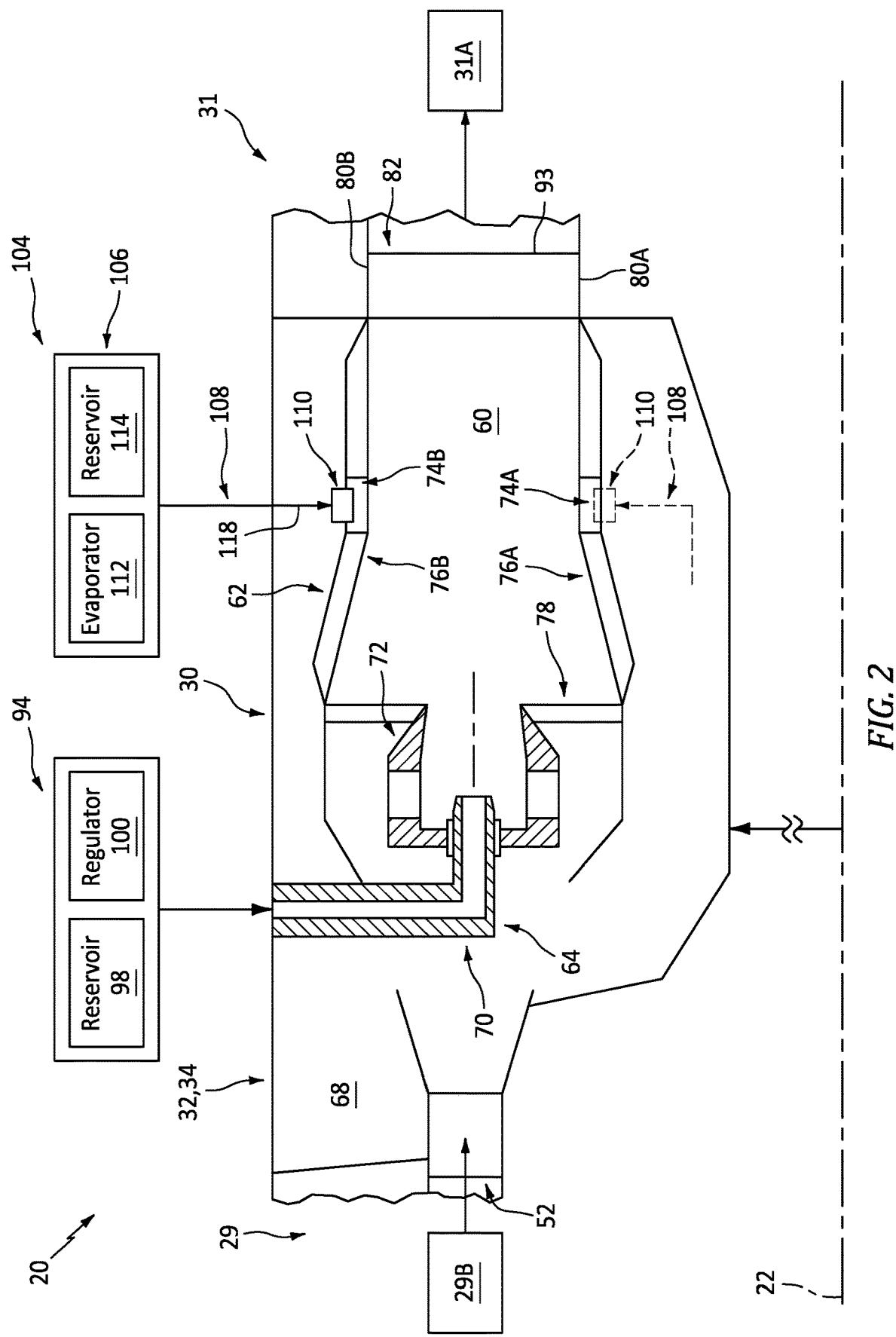
FIG. 2 is a partial schematic illustration of a combustor section between a compressor section and a turbine section.

FIG. 2 illustrate a portion of the combustor section 30 along the core flowpath 52 between the HPC section 29B and the HPT section 31A. This combustor section 30 includes the combustor 62, a diffuser plenum 68 and the one or more injector assemblies 64 (one visible in FIG. 2). Briefly, the combustor 62 is disposed within (e.g., surrounded by) the diffuser plenum 68—a compressed air plenum. This diffuser plenum 68 is formed by and/or within the engine housing 32 and its inner case 34. The diffuser plenum 68 receives the compressed core air from the HPC section 29B for subsequent provision into the combustion chamber 60. Each injector assembly 64 of FIG. 2 includes a fuel injector 70 mated with an air swirler structure 72. The fuel injector 70 injects the fuel into the combustion chamber 60. The air swirler structure 72 directs some of the core air from the diffuser plenum 68 into the combustion chamber 60 in a manner that facilitates mixing the core air with the injected fuel. One or more igniters (not shown) ignite the fuel-air mixture within the combustion chamber 60. One or more quench apertures 74A, 74B (generally referred to as "74") (e.g., dilution holes) in each wall 76A, 76B (generally referred to as "76") of the combustor 62 direct additional core air from the diffuser plenum 68 into the combustion chamber 60 to facilitate substantially complete burnout of (e.g., make stoichiometrically lean) the combustion products; e.g., the ignited fuel-air mixture.

Figure 3:
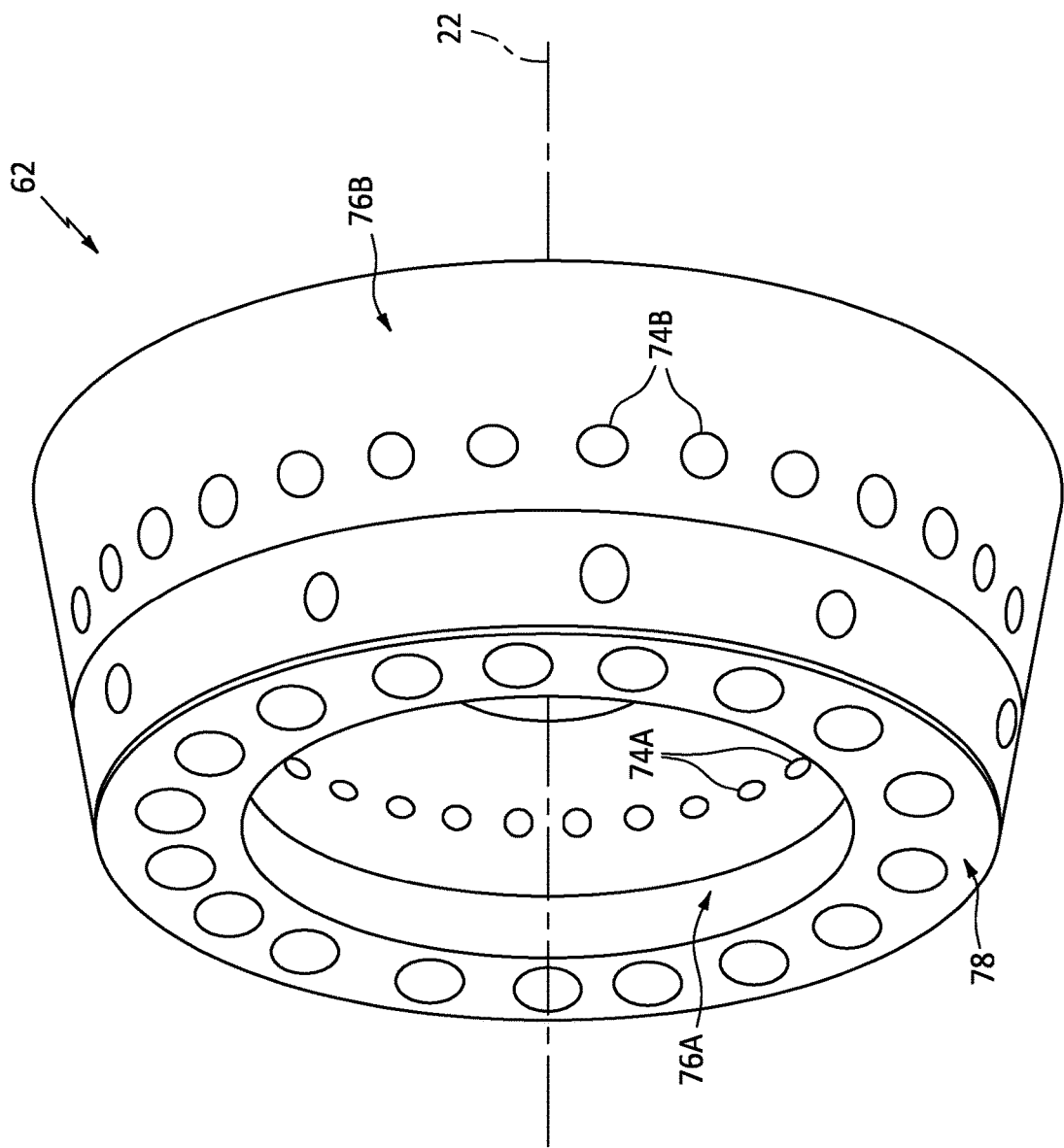
FIG. 3 is a perspective illustration of a combustor.

The combustor 62 may be configured as an annular combustor; e.g., an annular floating wall combustor. The combustor 62 of FIGS. 2 and 3, for example, includes an annular combustor bulkhead wall 78 ("bulkhead"), the tubular inner combustor wall 76A ("inner wall"), and the tubular outer combustor wall 76B ("outer wall"). The bulkhead 78 of FIG. 2 extends radially between and to the inner wall 76A and the outer wall 76B. The bulkhead 78 may be connected (e.g., mechanically fastened or otherwise attached) to the inner wall 76A and/or the outer wall 76B. Each combustor wall 76 projects axially along the axial centerline 22 out from the bulkhead 78 towards the HPT section 31A. The inner wall 76A of FIG. 2, for example, projects axially to and may be connected to an (e.g., tubular) inner platform 80A of a downstream stator vane array 82 in the HPT section 31A. The outer wall 76B of FIG. 2 projects axially to and may be connected to an (e.g., tubular) outer platform 80B of the downstream stator vane array 82. With the arrangement of FIG. 2, the combustion chamber 60 is formed by and extends radially within the combustor 62 between and to the inner wall 76A and the outer wall 76B. The combustion chamber 60 is formed by and extends axially (in an upstream direction along the core flowpath 52) into the combustor 62 from the stator vane array 82 to the bulkhead 78. The combustion chamber 60 also extends within the combustor 62 circumferentially about (e.g., completely around) the axial centerline 22, which may configure the combustion chamber 60 as a full-hoop annulus.

Figure 4:
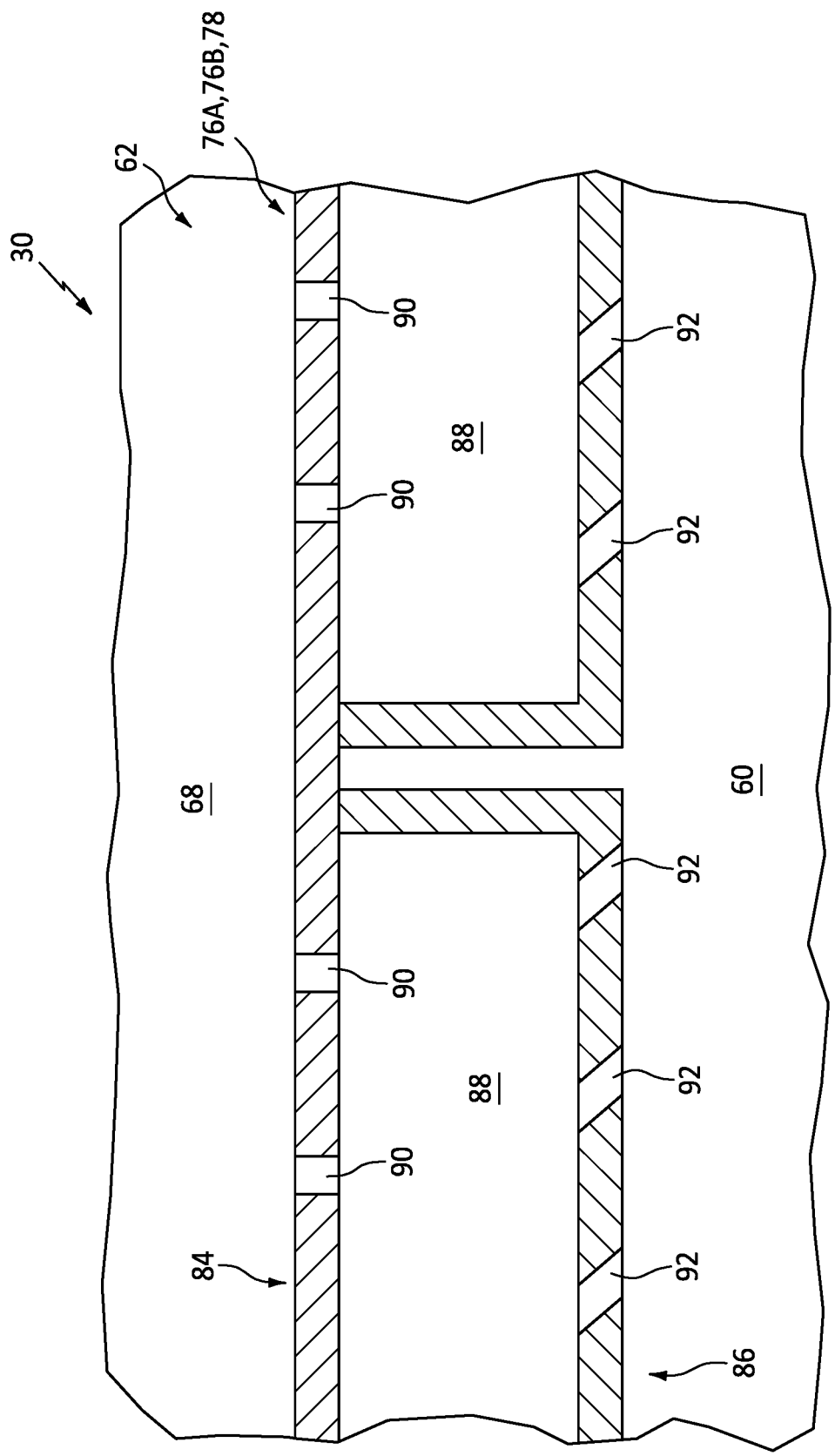
FIG. 4 is a partial sectional illustration of a combustor wall.

Referring to FIG. 4, any one or more or all of the walls 76A, 76B, 78 may each be configured as a multi-walled structure; e.g., a hollow, dual-walled structure. Each wall 76A, 76B, 78 of FIG. 4, for example, includes a combustor wall shell 84, a combustor wall heat shield 86 (e.g., a liner) and one or more combustor wall cooling cavities 88 (e.g., impingement cavities) formed by and (e.g., radially and/or axially) between the shell 84 and the heat shield 86. Each cooling cavity 88 of FIG. 4 is fluidly coupled with the diffuser plenum 68 through one or more cooling apertures 90 in the shell 84; e.g., impingement apertures. Each cooling cavity 88 of FIG. 4 is fluidly coupled with the combustion chamber 60 through one or more cooling apertures 92 in the heat shield 86; e.g., effusion apertures. Of course, various other multi-walled combustor wall structures are known in the art, and the present disclosure is not limited to any particular ones thereof. Furthermore, it is contemplated any one or more or all of the walls 76A, 76B and/or 78 of FIG. 2 may each alternatively be configured as a single-walled structure. The shell 84 of FIG. 4, for example, may be omitted and the heat shield 86 may form a single walled liner/wall. However, for ease of description, each wall 76A, 76B, 78 may each be described below as the hollow, dual-walled structure.

Referring to FIG. 2, the stator vane array 82 includes the inner platform 80A, the outer platform 80B and a plurality of stator vanes 93 (one visible in FIG. 2). The stator vanes 93 are arranged circumferentially about the axial centerline 22 in an array; e.g., a circular array. Each of these stator vanes 93 extends radially across the core flowpath 52 between and to the inner platform 80A and the outer platform 80B. Each of the stator vanes 93 may also be connected to the inner platform 80A and/or the outer platform 80B. The stator vane array 82 and its stator vanes 93 are configured to turn and/or otherwise condition the combustion products exiting the combustion chamber 60 for interaction with a first stage of the HPT rotor 41 (see FIG. 1).

Figure 5:
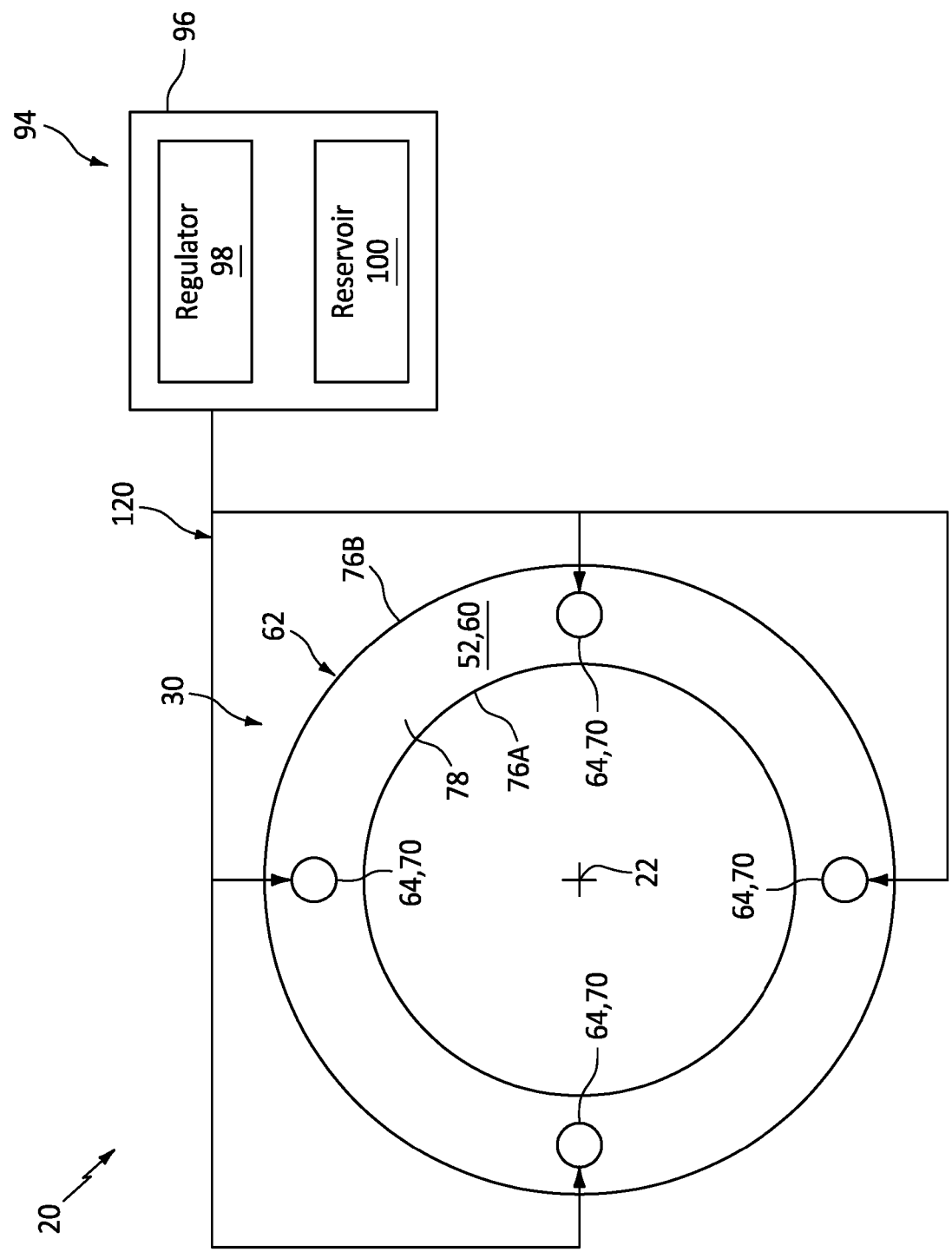
FIG. 5 is a schematic illustration of a fuel system configured with the combustor section.

Referring to FIG. 5, the turbine engine 20 includes a fuel system 94 for delivering the fuel to the combustor 62. This fuel system 94 includes a fuel source 96 and the one or more fuel injectors 70. The fuel source 96 of FIG. 5 includes a fuel reservoir 98 and/or a fuel flow regulator 100; e.g., a valve and/or a pump. The fuel reservoir 98 is configured to store the fuel before, during and/or after turbine engine operation. The fuel reservoir 98, for example, may be configured as or otherwise include a tank, a cylinder, a pressure vessel, a bladder or any other type of fuel storage container. The fuel flow regulator 100 is configured to direct and/or meter a flow of the fuel from the fuel reservoir 98 to one or more or all of the fuel injectors 70. The fuel injectors 70 may be arranged circumferentially about the axial centerline 22 in an array. Each fuel injector 70 is configured to direct the fuel received from the fuel source 96 into the combustion chamber 60 for combustion.

The fuel delivered by the fuel system 94 may be a non-hydrocarbon fuel; e.g., a hydrocarbon free fuel. Examples of the non-hydrocarbon fuel include, but are not limited to, hydrogen fuel (e.g., hydrogen ($H_2$) gas) and ammonia fuel (e.g., ammonia ($NH_3$) gas). The turbine engine 20 of FIG. 1 may thereby be configured as a non-hydrocarbon turbine engine; e.g., a hydrocarbon free turbine engine. The present disclosure, however, is not limited to non-hydrocarbon turbine engines. The fuel delivered by the fuel system 94, for example, may alternatively be a hydrocarbon fuel such as, but not limited to, kerosene or jet fuel. The turbine engine 20 of FIG. 1 may thereby be configured as a hydrocarbon turbine engine. Alternatively, the fuel system 94 may be configured as a multi-fuel system operable to deliver, individually or in combination, multiple different fuels (e.g., a non-hydrocarbon fuel and a hydrocarbon fuel, etc.) for combustion within the combustion chamber 60. The turbine engine 20 of FIG. 1 may thereby be configured as a multi-fuel turbine engine; e.g., a dual-fuel turbine engine.

Figure 6:
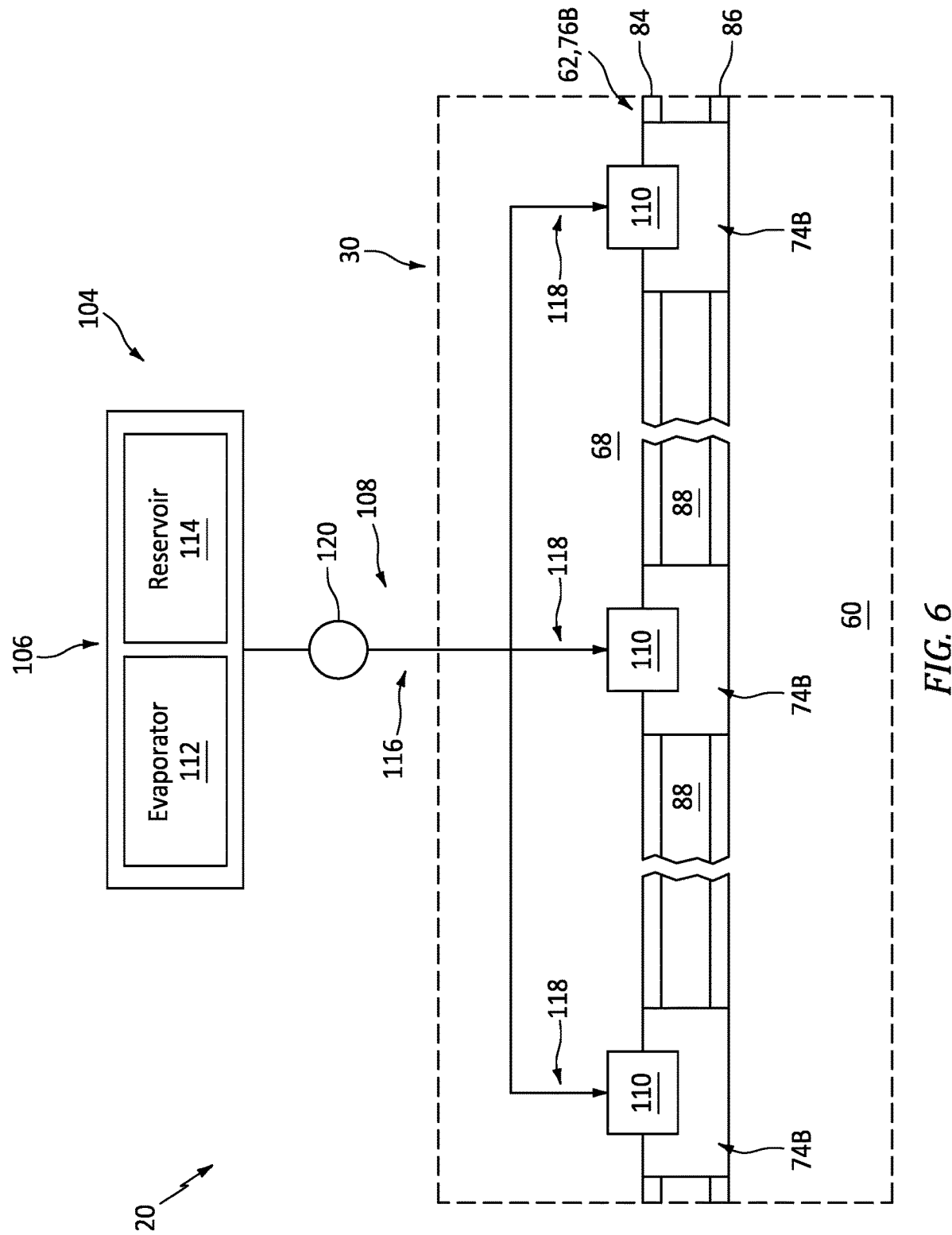
FIG. 6 is a partial schematic illustration of a steam system arranged with the combustor.

Referring to FIG. 6, the turbine engine 20 includes a steam system 104 for selectively delivering steam to the combustor 62. The steam system 104 of FIG. 6 includes a steam source 106, a steam delivery circuit 108 and one or more steam injectors 110. Briefly, each of the steam injectors 110 is arranged with a respective one of the quench apertures 74B in the outer wall 76B. Each of the quench apertures 74B may also be associated with a respective one of the steam injectors 110. However, each of the quench apertures 74B in a select subset of the quench apertures 74B may alternatively be associated with a respective one of the steam injectors 110. Thus, it is contemplated one or more of the quench apertures 74B may not be associated with one of the steam injectors 110. Furthermore, the steam injectors 110 may be described herein with respect to the quench aperture(s) 74B in the outer wall 76B for ease of illustration and description. However, one or more steam injectors 110 may also or alternatively be arranged with one or more or all of the quench apertures 74A in the inner wall 76A as described below in further detail.

The steam source 106 is configured to provide the steam to the steam delivery circuit 108 during turbine engine operation and, more particularly, during steam system operation. The steam source 106, for example, may be configured as or otherwise include an evaporator 112, which may be or otherwise include a fluid-to-fluid heat exchanger and/or an electrical heater. The evaporator 112 is configured to evaporate water into the steam during steam system operation. The water may be received from various sources. The steam source 106 of FIG. 6, for example, includes a water reservoir 114 fluidly coupled with and upstream of the evaporator 112. This water reservoir 114 is configured to store the water before, during and/or after turbine engine operation. Examples of the water reservoir 114 include, but are not limited to, a tank, a cylinder, a pressure vessel, a bladder or any other type of water storage container. Briefly, the water may be supplied to the water reservoir 114 by recovering water vapor from the combustion products flowing through the core flowpath 52 (see FIG. 1) and/or from another water source onboard or offboard an aircraft.

The steam delivery circuit 108 of FIG. 6 includes a supply circuit 116 and one or more feed circuits 118, where each feed circuit 118 is associated with a respective one of the steam injectors 110. The supply circuit 116 of FIG. 6 extends from an outlet from the steam source 106 to an interface with the feed circuits 118 such as a manifold. At the interface, the feed circuits 118 may be fluidly coupled in parallel to and downstream of the supply circuit 116. Each of the feed circuits 118 extends from the interface to an inlet of a respective one of the steam injectors 110. The steam delivery circuit 108 thereby fluidly couples the steam source 106 to the respective steam injectors 110.

The steam directed through the steam delivery circuit 108 may be regulated based on the combustion process within the combustion chamber 60 and/or based on a mode of turbine engine operation. The steam delivery circuit 108 of FIG. 6, for example, includes a steam flow regulator 120. The steam flow regulator 120 is arranged (e.g., fluidly coupled inline) with the supply circuit 116. The steam flow regulator 120 is configured to selectively direct and/or meter a flow of the steam from the steam source 106 to the steam injectors 110. For example, the steam flow regulator 120 may be configured as or otherwise include a control valve. This control valve may fully open, may fully close and/or may move to one or more partially open positions. While the steam flow regulator 120 is illustrated in FIG. 6 as being part of the supply circuit 116, that steam flow regulator 120 may alternatively be arranged at the interface between the supply circuit 116 and the feed circuits 118, at an inlet to the supply circuit 116, or otherwise. One or more or all of the feed circuits 118 may also or alternatively be provided with its own steam flow regulator 120. Furthermore, it is contemplated the steam delivered to one or more or all of the steam injectors 110 may still also or alternatively be regulated by adjusting an amount of steam provided (e.g., produced) by the steam source 106.

The steam injectors 110 of FIG. 6 are arranged circumferentially about the axial centerline 22 (see FIG. 2) and the combustion chamber 60 in an array; e.g., a circular array. These steam injectors 110 are configured to direct (e.g., inject) the steam, received from the steam source 106 through the steam delivery circuit 108, into the combustion chamber 60. This steam is introduced into the combustion chamber 60 along with the core air (quench air) that flows from the diffuser plenum 68, through the respective quench apertures 74B, and into the combustion chamber 60. Introducing the steam into the combustion chamber 60 along with the quench air may reduce a temperature of the combustion products within the combustion chamber 60. Reducing the temperature of the combustion products may reduce nitrogen oxide (NOx) production/formation within the combustion products.

Figure 7:
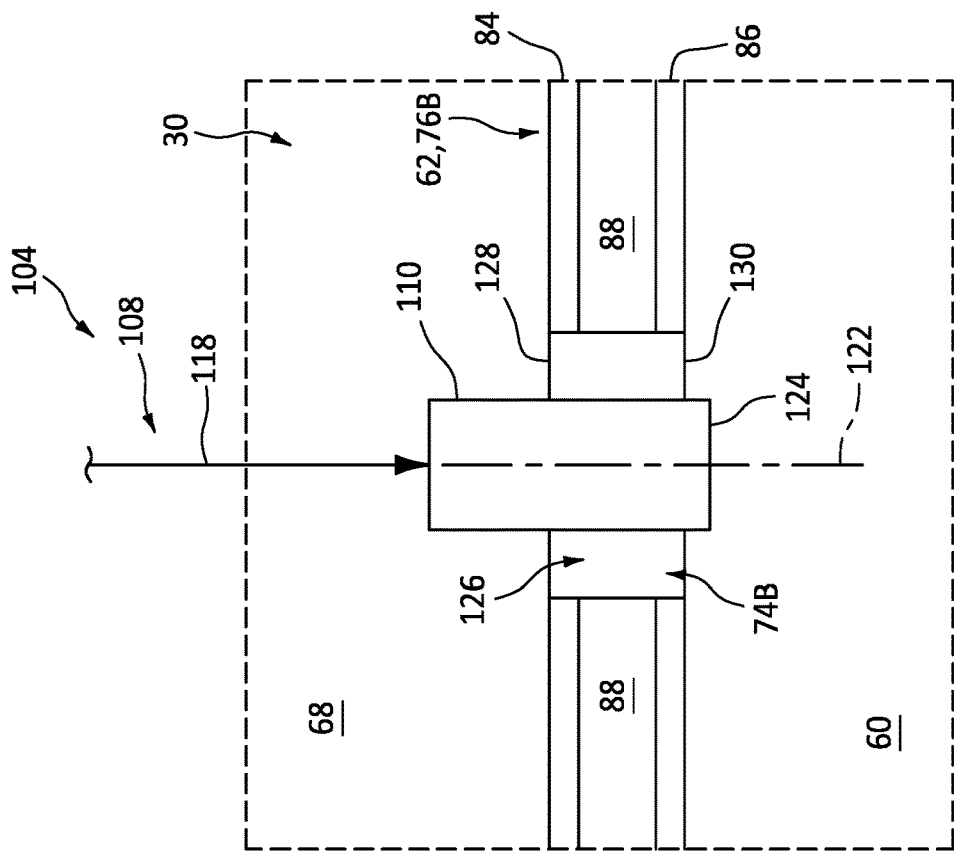
FIGS. 7-9 are partial schematic illustrations of a steam injector at various positions relative to a quench aperture.
Figure 8:
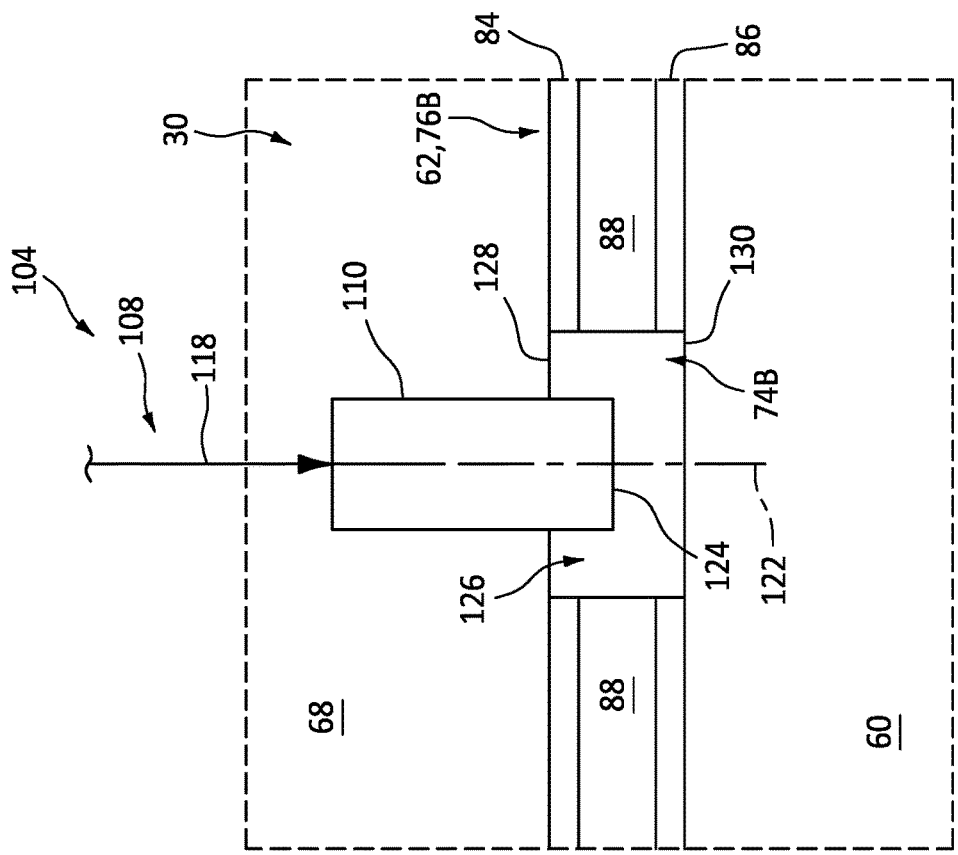

Referring to FIGS. 7 and 8, to provide more targeted delivery of the steam to the combustion chamber 60 through the respective quench apertures 74B, one or more or all of the steam injectors 110 may each be mated with a respective one of the quench apertures 74B. A body of the steam injector 110 of FIGS. 7 and 8, for example, extends longitudinally along a longitudinal centerline 122 (e.g., a centerline axis) of the respective steam injector 110 to a tip 124 of the respective steam injector 110. At least a portion of the steam injector 110 along its injector centerline 122 is arranged and extends within the respective quench aperture 74B. However, the steam injector 110 of FIGS. 7 and 8 does not plug the respective quench aperture 74B. More particularly, a port 126 is formed between the outer wall 76B and the steam injector 110. The quench air may thereby flow through the port 126 and around the steam injector 110 within/through the quench aperture 74B from the diffuser plenum 68 into the combustion chamber 60. This port 126 may be an annular port that circumscribes the steam injector 110. Alternatively, the port 126 may be disposed to one or more select sides of the steam injector 110. The port 126, for example, may alternatively have a non-annular (e.g., arcuate, U-shaped, L-shaped, etc.) cross-sectional geometry.

The injector tip 124 of FIG. 7 is disposed within the respective quench aperture 74B, where the steam injector 110 projects longitudinally along its injector centerline 122 (e.g., radially inward towards the axial centerline 22; see FIG. 2) partially into the quench aperture 74B. Here, the injector tip 124 is disposed at an intermediate position between an inlet 128 into the respective quench aperture 74B and an outlet 130 from the respective quench aperture 74B. Of course, the injector tip 124 may alternatively be disposed at the quench aperture inlet 128. With such steam injector arrangements, the steam injector 110 may inject the steam directly into the respective quench aperture 74B.

The injector tip 124 of FIG. 8 is disposed within the combustion chamber 60, where the respective steam injector 110 projects longitudinally along its injector centerline 122 (e.g., radially inward towards the axial centerline 22; see FIG. 2) through the quench aperture 74B and partially (e.g., slightly) into the combustion chamber 60. Here, the injector tip 124 is spaced radially inward into the combustion chamber 60 from the quench aperture outlet 130. Of course, the injector tip 124 may alternatively be disposed at the quench aperture outlet 130. With such steam injector arrangements, the steam injector 110 may inject the steam directly into the combustion chamber 60.

Figure 9:
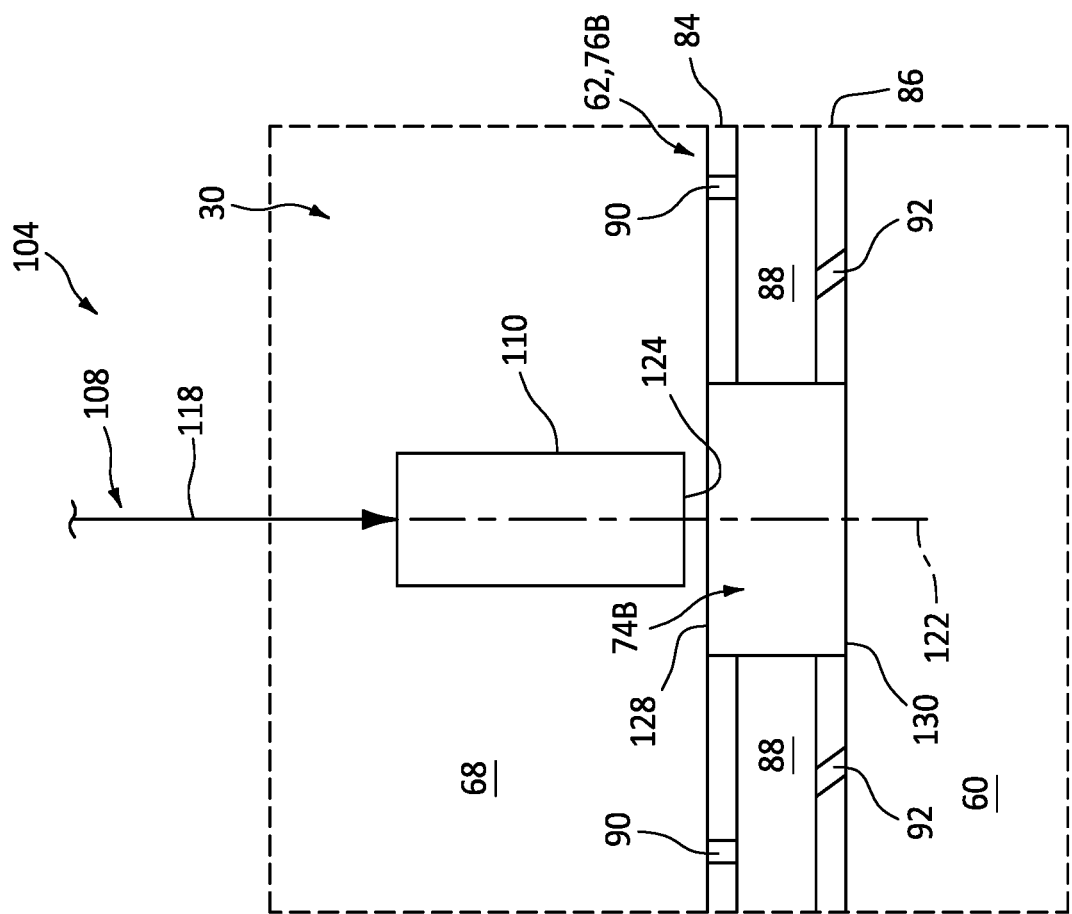

While the steam injector 110 of FIGS. 7 and 8 provide more targeted steam delivery, the present disclosure is not limited to such arrangements. For example, referring to FIG. 9, one or more or all of the steam injectors 110 may each alternatively be spaced from the outer wall 76B. The steam injector 110 of FIG. 9, for example, is (e.g., completely) disposed within the diffuser plenum 68 next to the respective quench aperture 74B. Here, the injector tip 124 is spaced radially outboard from the respective quench aperture 74B. With such an arrangement, the steam may be directed out of the steam injector 110 such that a majority of that steam flows into the respective quench aperture 74B. However, some (e.g., 10, 20 or 30%) of the steam may also flow elsewhere across the outer wall 76B (e.g., sequentially through the elements 90, 88 and 92) to enhance cooling of the outer wall 76B about the respective quench aperture.

Figure 10:
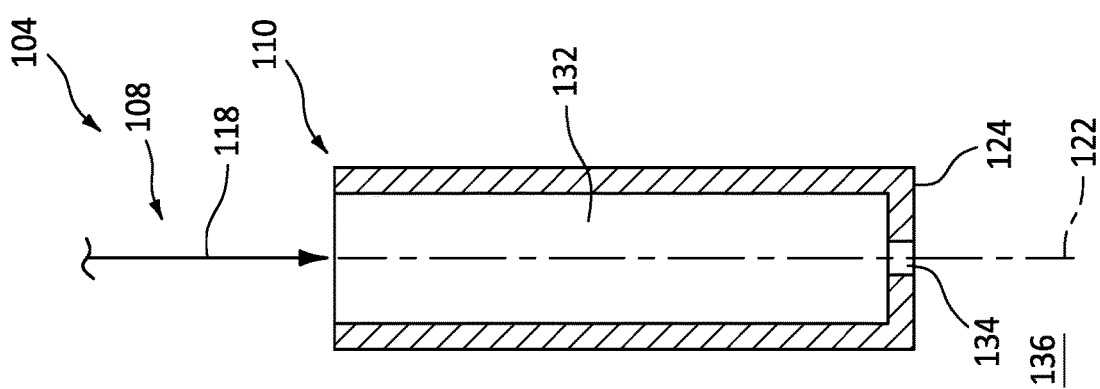
FIGS. 10-12 are partial schematic illustrations of the steam injector with various steam outlet arrangements.
Figure 11:
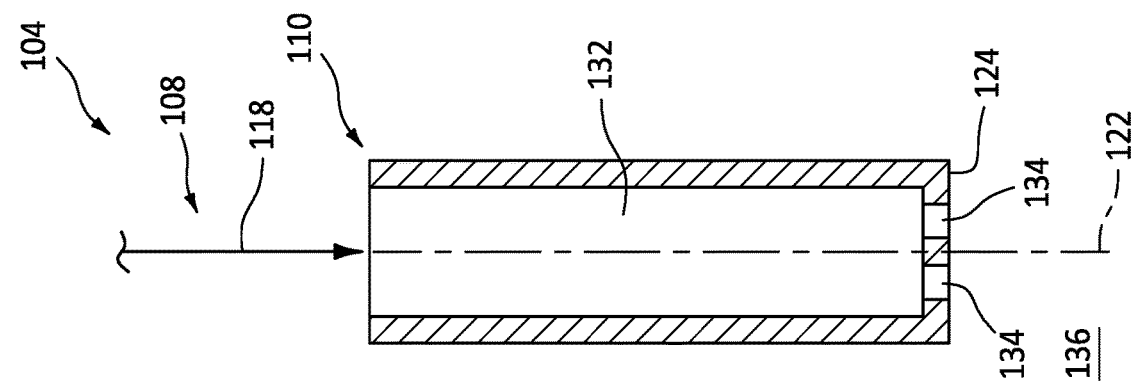
Figure 12:
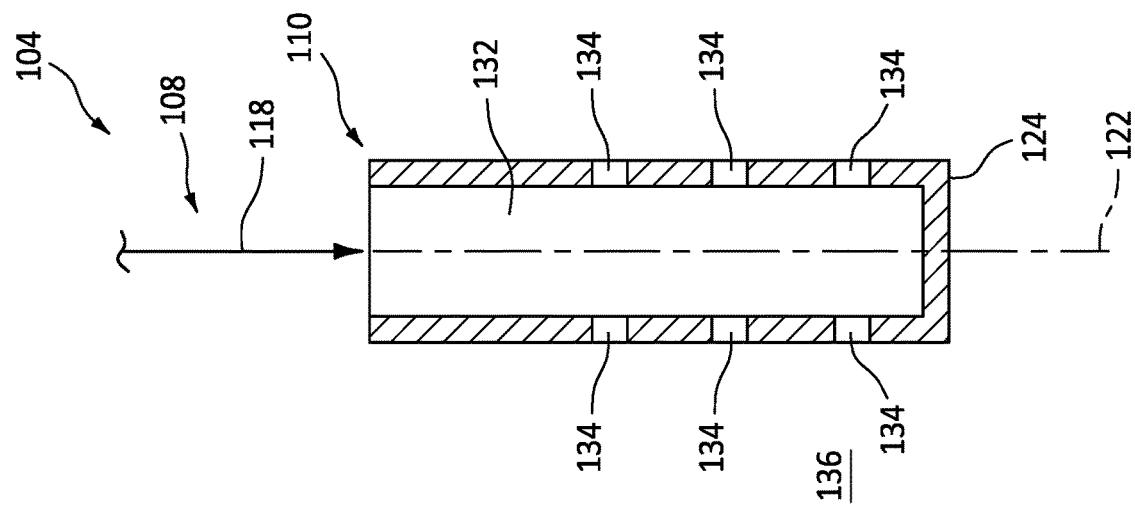

Referring to FIGS. 10-12, each steam injector 110 includes an internal steam passage 132 and one or more steam outlets 134. The steam passage 132 is fluidly coupled with and downstream of a respective one of the feed circuits 118. The steam passage 132 of FIGS. 10-12 extends longitudinally within the steam injector 110 along the injector centerline 122 towards the injector tip 124. Each of the steam outlets 134 extends through a wall of the respective steam injector 110 from the steam passage 132 to an exterior of the steam injector 110. Each steam outlet 134 thereby fluidly couples the steam passage 132 to a volume 136 exterior to the steam injector 110 and its steam outlet 134. This exterior volume 136 may be, for example: the quench aperture 74B of FIG. 7; the combustion chamber 60 and/or the quench aperture 74B of FIG. 8; or the diffuser plenum 68 of FIG. 9. Each steam injector 110 of FIGS. 10-12 is configured to direct a flow (e.g., a jet) of the steam out of the steam passage 132, through each steam outlet 134, and into the exterior volume 136 along a respective trajectory.

In some embodiments, referring to FIG. 10, one or more or all of the steam injectors 110 may each be configured with a single steam outlet 134. The steam injector 110 of FIG. 10, for example, is configured as a (e.g., unidirectional) steam nozzle. In other embodiments, referring to FIGS. 11 and 12, one or more or all of the steam injectors 110 may each be configured with multiple of the steam outlets 134. The steam injectors 110 of FIGS. 11 and 12, for example, are configured as (e.g., multi-directional) showerhead steam injectors.

Figure 14:
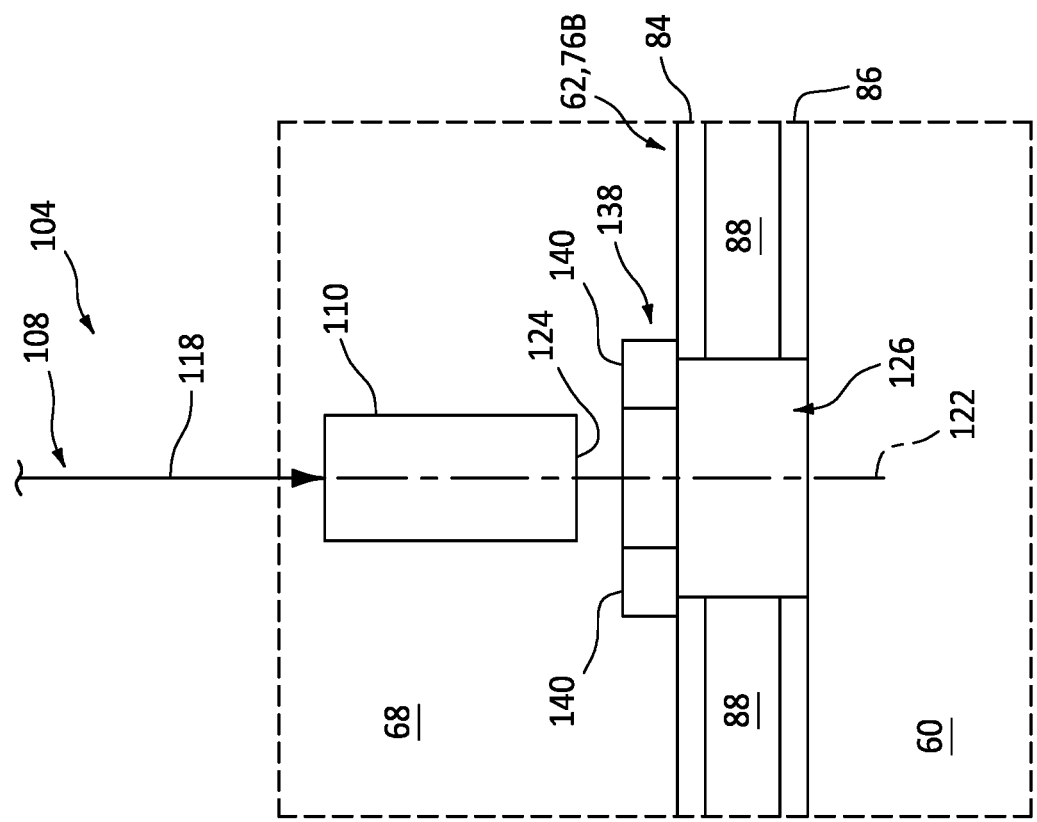
FIGS. 13 and 14 are partial schematic illustrations of the steam system and the combustor with various mixer arrangements.
Figure 13:
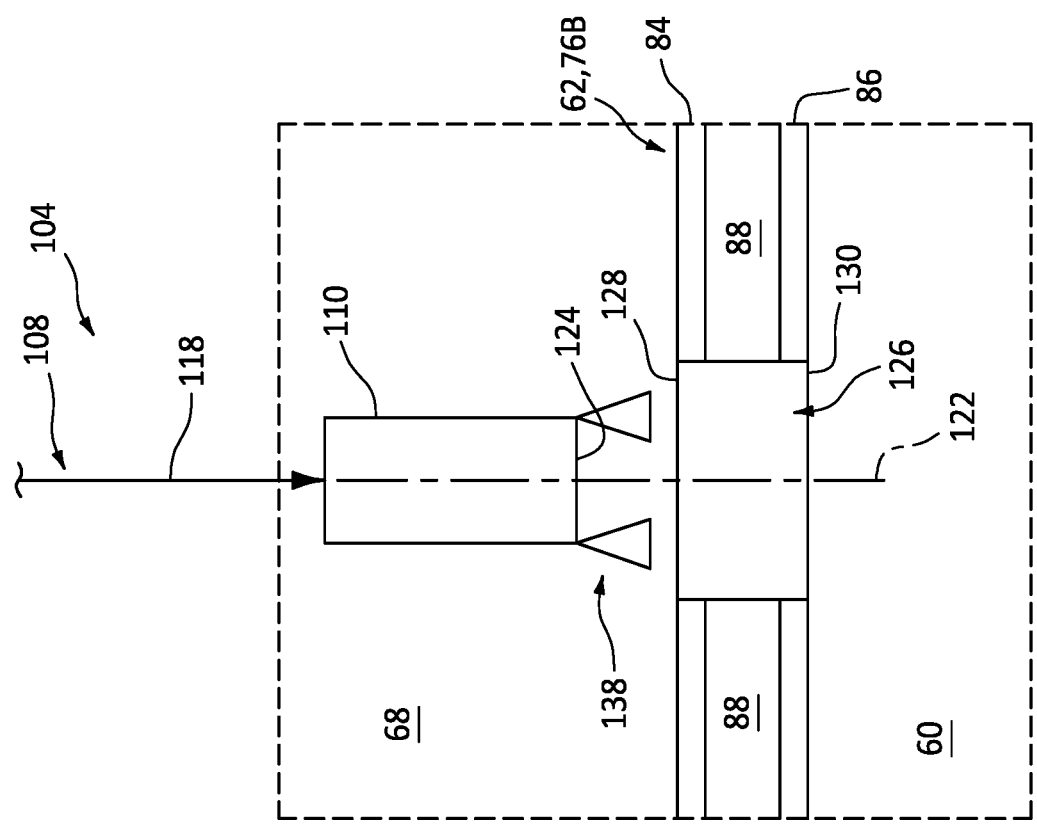

Referring to FIGS. 13 and 14, to enhance mixing of the steam with the quench air, one or more or all of the steam injectors 110 may each be arranged with an air-steam mixer 138. The mixer 138 of FIG. 13, for example, is configured as part of (or may otherwise be attached to) the steam injector 110 at (e.g., on, adjacent or proximate) the injector tip 124. The mixer 138 of FIG. 14, on the other hand, is configured as part of (or may otherwise be attached to) the outer wall 76B. The mixer 138 of FIG. 14, for example, may be configured as part of (or may otherwise be attached to) a grommet at least partially forming the respective quench aperture 74B through the outer wall 76B. Examples of the mixer 138 include, but are not limited to, a lobed mixer (e.g., see FIG. 13) and a swirler mixer (e.g., see FIG. 14). Briefly, the swirler mixer 138 of FIG. 14 includes an array of swirler vanes 140 arranged circumferentially around (e.g., circumscribing) the steam injector 110, for example, at or about the quench aperture inlet 128.

Figure 15A:
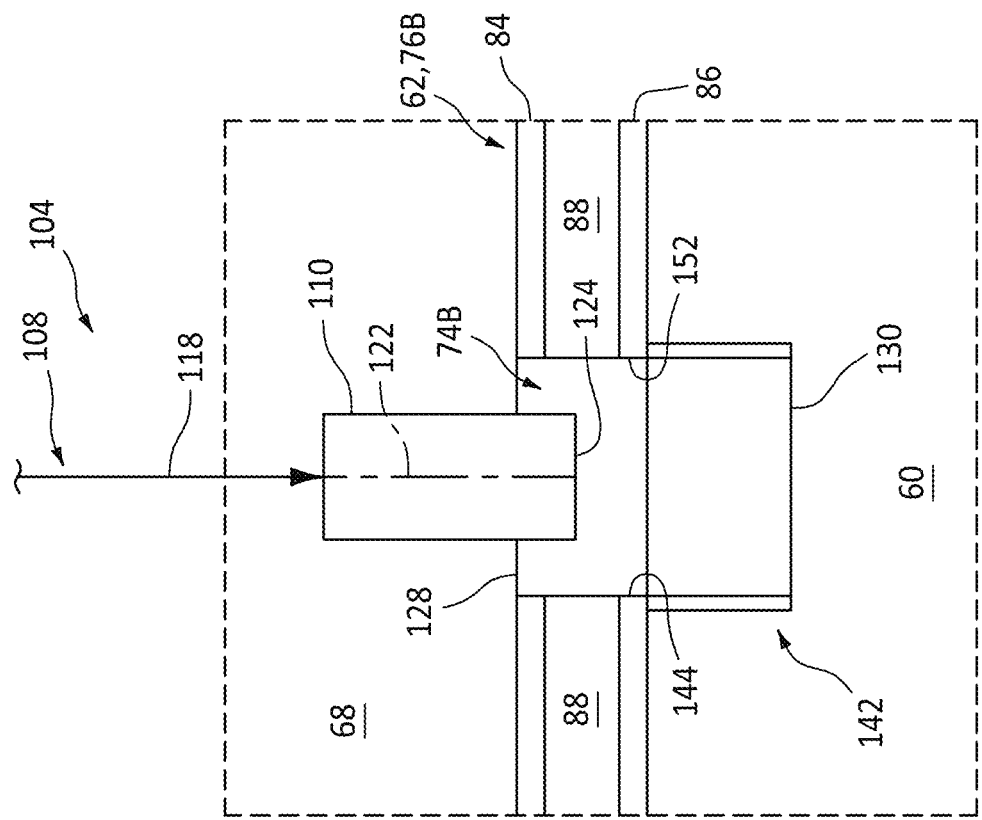
FIGS. 15A-B and 16A-B are partial schematic illustrations of the steam system and the combustor with various chute arrangements.
Figure 15B:
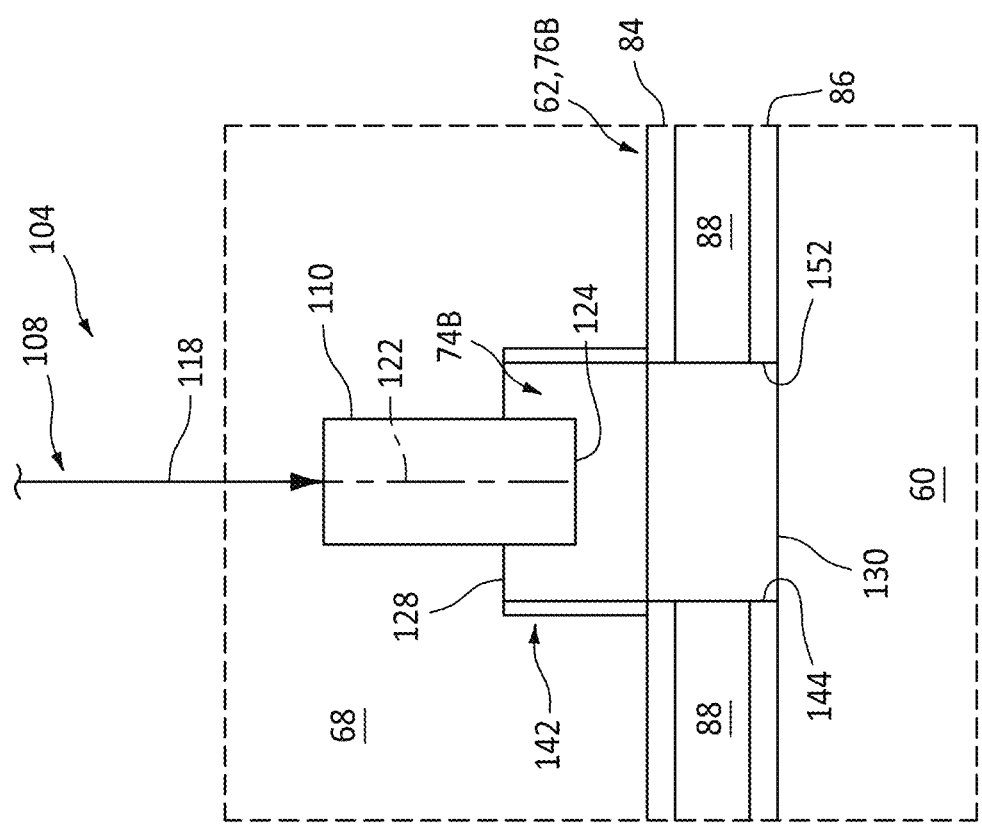
Figure 16B:
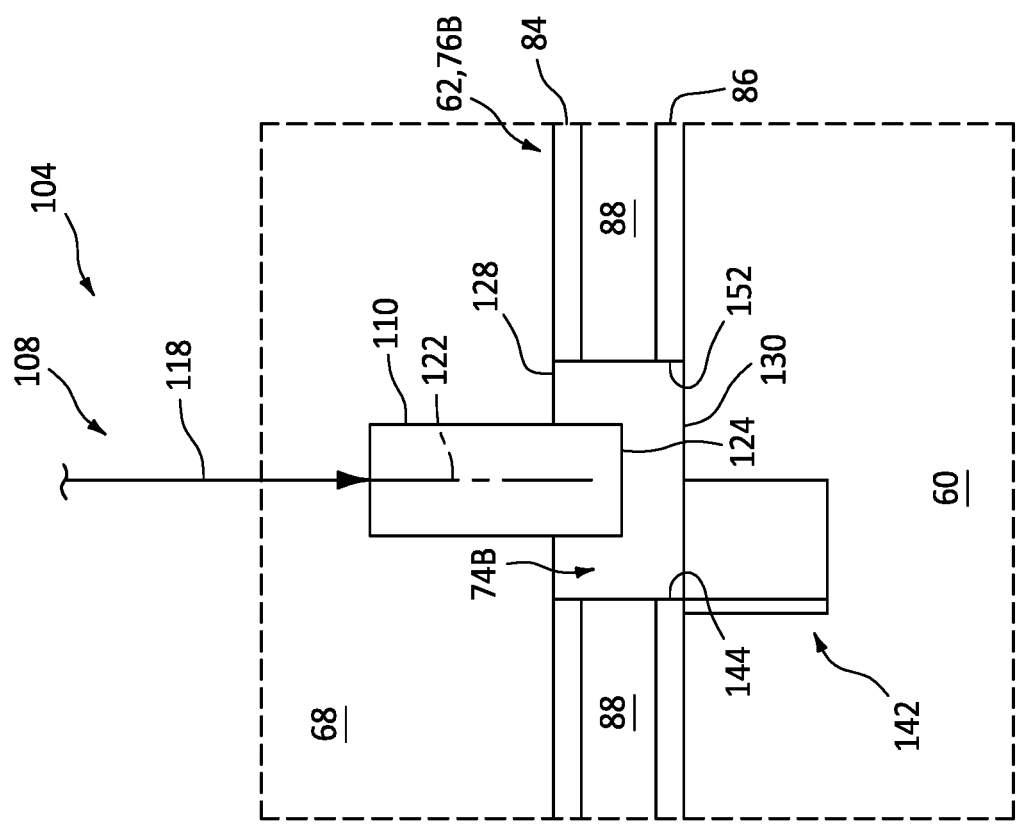
Figure 16A:
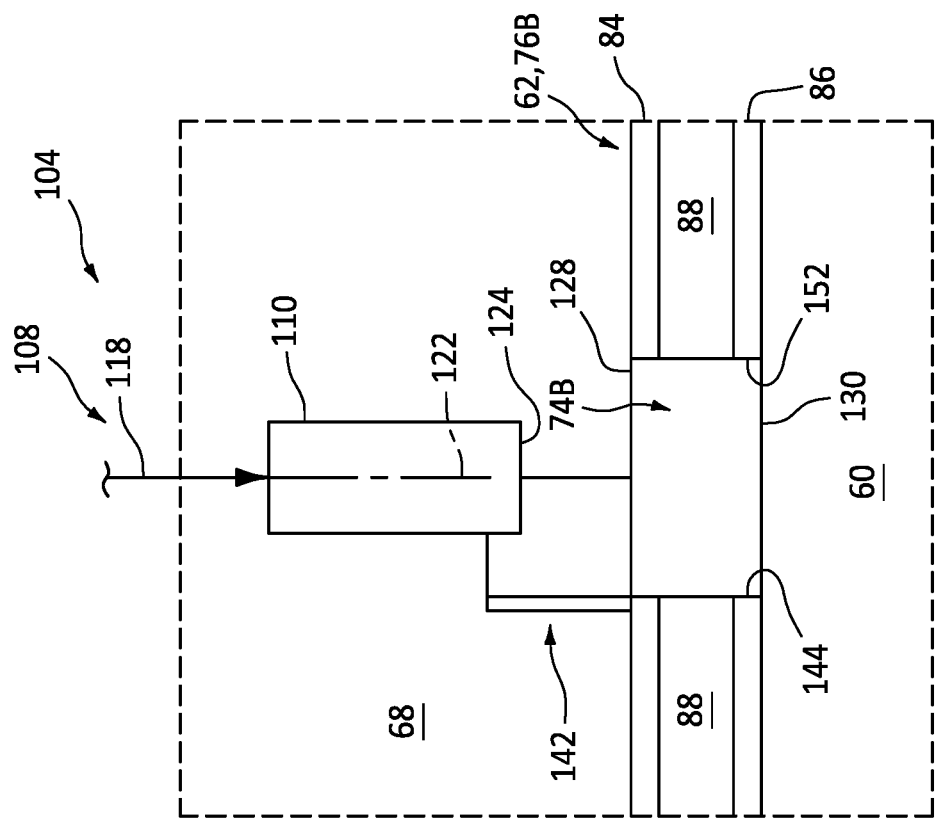

Referring to FIGS. 15A-16B, to alternatively or further enhance mixing of the steam with the quench air, one or more or all of the steam injectors 110 may each be arranged with a chute 142. The provision of the chute 142 may be in addition to or instead of the provision of the mixer 138 discussed above. The chute 142 of FIGS. 15A and 16A projects partially into the diffuser plenum 68 from a base of the outer wall 76B. However, referring to FIGS. 15B and 16B, it is contemplated the chute 142 may also or alternatively project partially into the combustion chamber 60 from the base of the outer wall 76B. The chute 142 of FIGS. 15A-16B extends circumferentially about (e.g., completely or partially around) the quench aperture outlet 130. This chute 142 is configured to (e.g., structurally and/or functionally) extend a length of the respective quench aperture 74B to provide additional distance and time for mixing of the steam and the quench air. Referring to FIGS. 15A and 15B, the chute 142 may be configured with a tubular body which circumscribes an upstream and/or downstream portion of the quench aperture 74B. Alternatively, referring to FIGS. 16A and 16B, the chute 142 may be configured with an arcuate body which extends partially around the quench aperture inlet 128 and/or the quench aperture outlet 130. Here, the chute 142 is positioned at a lateral upstream side 144 of the quench aperture 74B and its quench aperture inlet 128 and/or quench aperture outlet 130; e.g., relative to combustion products flow within the combustion chamber 60.

Figure 17C:
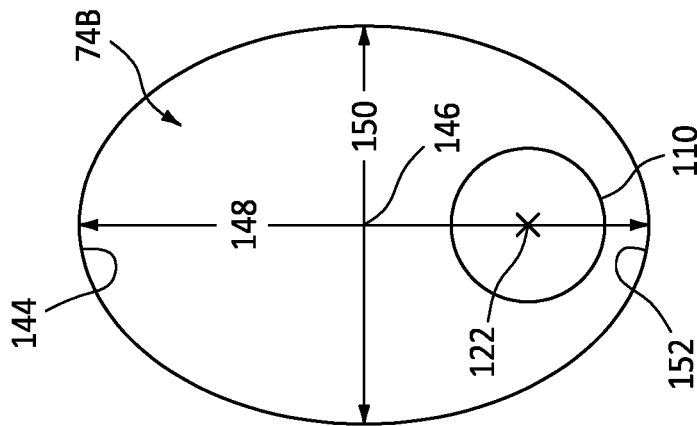
FIGS. 17A-C are schematic illustrations of various steam injector arrangements with the quench aperture.
Figure 17B:
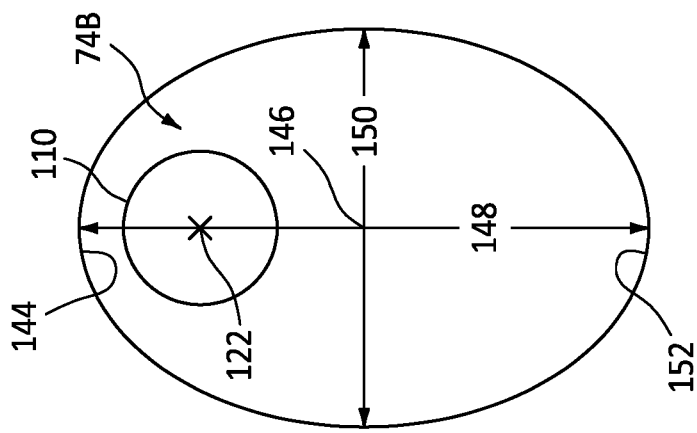
Figure 17A:
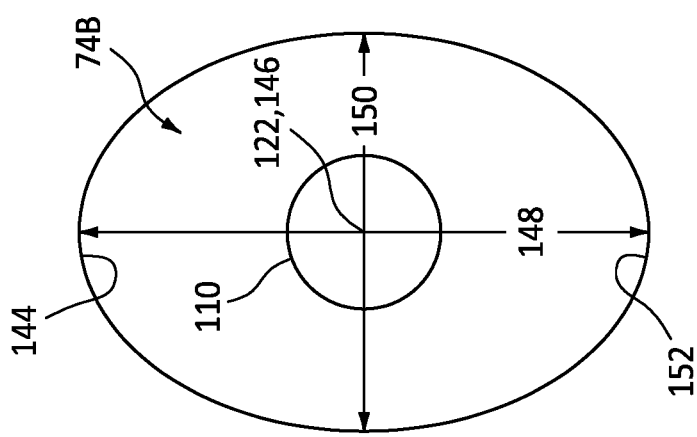

In some embodiments, referring to FIGS. 17A-C, one or more or all of the quench apertures 74B may each be configured with an elongated cross-sectional geometry when viewed, for example, in a reference plane perpendicular to a longitudinal centerline 146 of the respective quench aperture 74B. This elongated cross-sectional geometry may have a slot shape, an oval shape, a rectangular shape or any other elongated annular curved and/or polygonal shape. The elongated cross-sectional geometry of FIGS. 17A-C has a major axis dimension 148 and a minor axis dimension 150, where the major axis dimension 148 may be measured between the lateral upstream side 144 of the respective quench aperture 74B and a lateral downstream side 152 of the respective quench aperture 74B. Such an arrangement may accommodate movement between (a) the combustor 62 and its outer wall 76B and (b) the respective steam injector 110 due to, for example, differential thermal expansion between the combustor 62 and the engine housing 32 and its inner case 34, particularly where the major axis is generally aligned with the thermally induced shifting.

In some embodiments, referring to FIG. 17A, one or more or all of the steam injectors 110 may each be positioned at an intermediate (e.g., center) location within the respective quench aperture 74B. The steam injector 110 of FIG. 17A, for example, is symmetrically positioned within (e.g., coaxial with) the respective quench aperture 74B. In other embodiments however, referring to FIGS. 17B and 17C, one or more or all of the steam injectors 110 may each alternatively be asymmetrically positioned within the respective quench aperture 74B. The steam injector 110 of FIG. 17B, for example, is disposed at (or closer to) the lateral upstream side 144 of the respective quench aperture 74B. With this arrangement, the steam (versus the quench air) may more quickly interact with the combustion products within the combustion chamber to reduce temperature. Alternatively, the steam injector 110 of FIG. 17C is disposed at (or closer to) the lateral downstream side 152 of the respective quench aperture 74B. With this arrangement, the quench air (versus the steam) may more quickly interact with the combustion products to facilitate more complete combustion.

Figure 18:
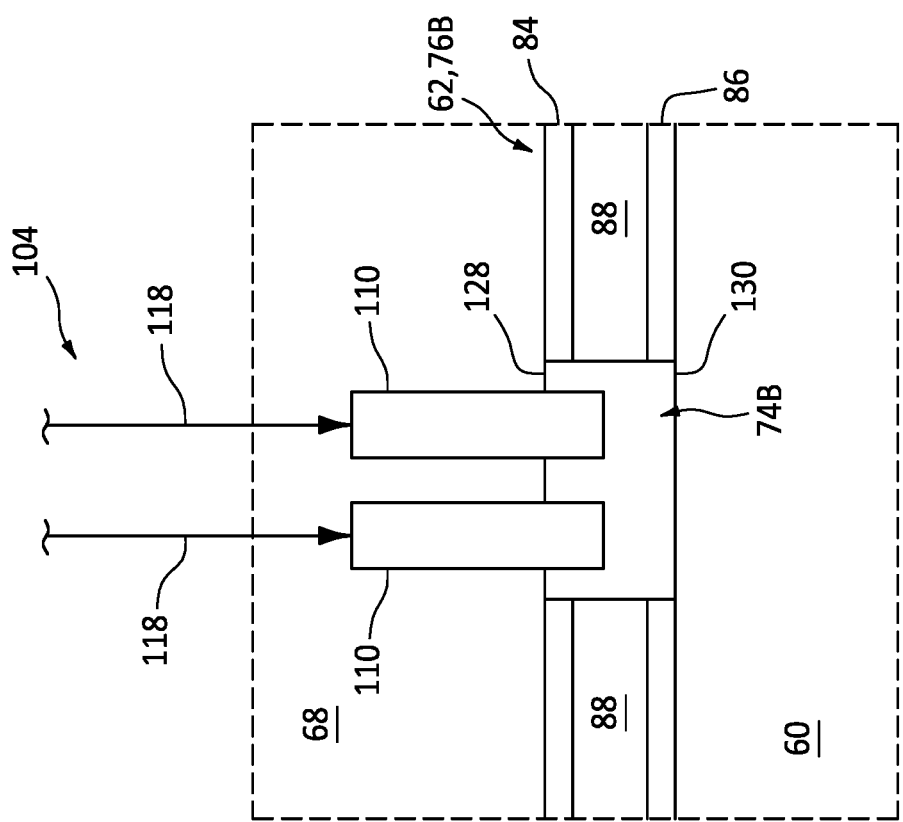
FIG. 18 is a schematic illustration of multiple steam injectors arranged with a common quench aperture.

The steam system 104 may be configured with a 1:1 ratio between the steam injectors 110 and the respective quench apertures 74B. More particularly, each respective quench aperture 74B is associated with a single one of the steam injectors 110. The present disclosure, however, is not limited to such an arrangement. For example, referring to FIG. 18, one or more or all of the respective quench apertures 74B may each be associated with multiple of the steam injectors 110.

In some embodiments, referring to FIG. 2, each steam injector 110 may be arranged with a respective one of the outer quench apertures 74B. In other embodiments, however, one or more or all of the steam injectors 110 may alternatively be arranged with a respective one of the inner quench apertures 74A (see dashed line injector 110). The steam delivery circuit 108, for example, may be routed through the diffuser plenum 68 (and/or through a pre-diffuser strut) towards the respective inner quench apertures 74A.

The steam system 104 may be included in various turbine engines other than the one described above. The steam system 104, for example, may be included in a geared turbine engine where a geartrain connects one or more shafts to one or more rotors in a fan section, a compressor section and/or any other engine section. Alternatively, the steam system 104 may be included in a turbine engine configured without a geartrain; e.g., a direct drive turbine engine. The steam system 104 may be included in a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
 a housing comprising an air plenum;
 a combustor disposed within the air plenum, the combustor including a combustor wall and a combustion chamber, the combustor wall disposed between the combustion chamber and the air plenum, and the combustor wall comprising a quench aperture that extends through the combustor wall from the air plenum to the combustion chamber; and
 a steam injector projecting partially into or through the quench aperture, the steam injector non-coaxial with the quench aperture.

2. The assembly of claim 1, further comprising:
 a steam system comprising the steam injector;
 the steam system configured to direct steam out of the steam injector into the combustion chamber with air flowing through the quench aperture from the air plenum into the combustion chamber.

3. The assembly of claim 2, further comprising a mixer configured to mix the steam with the air.

4. The assembly of claim 2, wherein
 the steam injector is configured with a plurality of steam outlets; and
 the steam system is configured to direct the steam out of the steam injector through the plurality of steam outlets.

5. The assembly of claim 1, wherein the steam injector projects partially into the quench aperture.

6. The assembly of claim 1, wherein
 the combustor wall further comprises a chute; and
 the chute projects partially into the air plenum and extends circumferentially about an inlet to the quench aperture from the air plenum.

7. The assembly of claim 6, wherein the chute comprises a tubular body.

8. The assembly of claim 1, wherein the quench aperture has a longitudinal centerline and an elongated cross-sectional geometry in a reference plane perpendicular to the longitudinal centerline.

9. An assembly for a turbine engine, comprising:
 a housing comprising an air plenum;
 a combustor disposed within the air plenum, the combustor including a combustor wall and a combustion chamber, the combustor wall disposed between the combustion chamber and the air plenum, and the combustor wall comprising a quench aperture that extends through the combustor wall from the air plenum to the combustion chamber; and
 a steam injector projecting partially into or through the quench aperture;
 wherein the quench aperture extends laterally between an upstream side and a downstream side relative to a flow of combustion products within the combustion chamber; and
 wherein the steam injector is arranged closer to the upstream side than the downstream side.

10. An assembly for a turbine engine, comprising:
 a housing comprising an air plenum;
 a combustor disposed within the air plenum, the combustor including a combustor wall and a combustion chamber, the combustor wall disposed between the combustion chamber and the air plenum, the combustor wall comprising a quench aperture that extends longitudinally along a longitudinal centerline through the combustor wall from the air plenum to the combustion chamber, and the quench aperture having an elongated cross-sectional geometry in a reference plane perpendicular to the longitudinal centerline; and
 a steam system comprising a steam injector, the steam system configured to direct steam out of the steam injector into the combustion chamber with air flowing through the quench aperture from the air plenum into the combustion chamber, and the steam injector asymmetrically positioned with the quench aperture.

11. The assembly of claim 10, wherein the steam injector projects partially into or through the quench aperture.

* * * * *